Patented Aug. 16, 1938

2,127,483

UNITED STATES PATENT OFFICE 2,127,483

THIOINDOXYL-ANIL AND PROCESS OF MAKING THE SAME

Emeric Havas, Pitman, N. J., assignor to E. I. du Pont de Nemours & Company, Wilmington, Del., a corporation of Delaware No Drawing. Application October 30, 1936, Serial No. 108,364

2 Claims. (Cl. 260—330)

This invention relates to novel organic compounds, and includes a process for making the same.

It is an object of this invention to provide novel compounds which are useful in the art of dyeing cellulose acetate and related materials. It is a further object of this invention to provide a process for manufacturing the novel compounds aforementioned. Other and further important objects of this invention will appear as the description proceeds.

I have found that compounds of the general formula

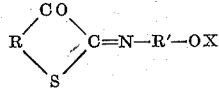

wherein R is an ortho-arylene radical of the benzene or naphthalene series, R' is an arylene radical of the benzene or naphthalene series and X is a lower alkyl radical, and wherein both R and R' may carry inert substituents, such as alkyl, alkoxy, hydroxy or halogen, but no basic or acidic substituents, possess remarkable properties which render them valuable in the dyeing of cellulose esters and ethers.

The novel compounds of my invention may be synthesized by condensing a suitable thioindoxyl compound, for instance a compound of the formula

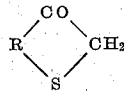

with a nitroso-phenol compound of the general formula ON–R'–OH, and akylating the condensation products. In these formulas for the initial material, R and R' represent arylene radicals of the benzene or naphthalene series. Both may carry inert substituents, such as alkyl, hydroxy or halogen, but both radicals should be free of basic substituents such as amino and alkylamino, and of water-solubilizing acidic substituents, such as sulfo or carboxy.

The condensation may be effected by warming the two reactants in alkaline, aqueous-alcoholic medium, in the usual manner.

The alkylation may likewise be performed in the usual manner, for instance by treatment with dialkyl sulfate in aqueous alkaline medium.

Without limiting my invention to any particular procedure, the following example will serve to illustrate my preferred mode of operation. Parts mentioned are by weight.

A. Synthesis of hydroxy compound 85 parts of 6-ethoxy-thioindoxyl were dissolved in 425 parts of ethyl alcohol. 255 parts of caustic soda of 30% strength and 425 parts of water were added at 50° C. The solution thus obtained was stirred into 4,000 parts of water at 40° C.

80 parts of p-nitroso-phenol solution of 75% strength were added. The mass was stirred at 40–50° C. for 1 hour. 800 parts of salt then were added, the mass stirred for an additional 2 hours, and the precipitated product removed by filtration. The filter cake was washed with 20% salt solution until the filtrates were colorless.

B. Alkylation

The product thus obtained was dissolved in 4,000 parts of water and 20 parts of 30% caustic soda solution at 80° C. and the solution filtered to remove insoluble impurities. The filtrate was cooled to 50° C. and 75 parts of dimethyl-sulfate added. The mass was stirred at 50° C. until the red solution was transformed into a yellow suspension. The precipitated product was filtered off, washed with water, and dried. 88 parts of a yellow solid melting at 141° C. was obtained. The product had the probable formula:

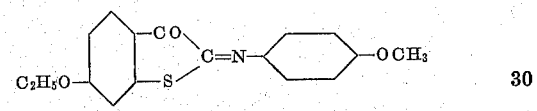

C. Preparation of dye powder 60 parts of the above product, 85 parts of dextrine and 5 parts of lauryl sodium sulfate were mixed with a little water and subjected to viscous milling in order to produce a dispersible product. The plastic mass was dried under vacuum and ground.

D. Dyeing of cellulose acetate

Acetate silk was dyed with this product by the following procedure:

The color was stirred with 50 parts of water and 2% of soap, based on the weight of goods to be dyed. The cellulose acetate fabric was immersed in the solution and dyed at 180° F. for 45 minutes. The printed goods then were rinsed and dried in the usual manner. The fiber was dyed to a bright yellow shade of good fastness properties.

In a similar manner other compounds of the above general formula may be synthesized.

It will be understood that my invention is susceptible of wide variation and modification within the skill of those versed in this art.

I claim:
1. The compound having the formula

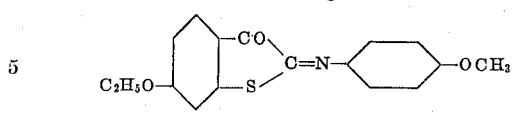

said compound being substantially identical with the compound obtainable by condensing 6-ethoxy-thioindoxyl in alkaline, aqueous-alcoholic medium, with p-nitroso phenol, and methylating the condensation product.

2. The process which comprises condensing 6-ethoxy-thioindoxyl in alkaline, aqueous-alcoholic medium, with p-nitroso-phenol, and methylating the resulting condensation product.

EMERIC HAVAS.